(12) United States Patent
Richardson et al.

(10) Patent No.: US 6,249,851 B1
(45) Date of Patent: Jun. 19, 2001

(54) COMPUTER SYSTEM HAVING NON-BLOCKING CACHE AND PIPELINED BUS INTERFACE UNIT

(75) Inventors: Nicholas J. Richardson, La Jolla; Charles A. Stack, Del Mar; Ut T. Nguyen, San Diego, all of CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/139,847

(22) Filed: Aug. 25, 1998

(51) Int. Cl.$^7$ ........................................... G06F 12/00
(52) U.S. Cl. ..................... 711/167; 711/141; 711/150; 711/146; 711/152
(58) Field of Search ........................... 711/167, 141, 711/117, 169, 118, 125, 140, 146, 151, 150, 152; 710/6, 128, 100

(56) References Cited

U.S. PATENT DOCUMENTS

| | | | |
|---|---|---|---|
| 3,641,505 | * | 2/1972 | Artz et al. .............................. 710/100 |
| 5,325,510 | * | 6/1994 | Frazier ................................... 711/118 |
| 5,581,734 | * | 12/1996 | DiBrino et al. ....................... 711/169 |
| 5,623,628 | * | 4/1997 | Brayton et al. ....................... 711/141 |
| 5,655,102 | * | 8/1997 | Galles ................................... 711/150 |
| 5,835,739 | * | 11/1998 | Bell et al. ............................. 710/128 |
| 5,900,020 | * | 5/1999 | Safranek et al. ..................... 711/167 |
| 5,905,876 | * | 5/1999 | Pawlowski et al. .................. 711/117 |
| 5,923,898 | * | 7/1999 | Genduso et al. ......................... 710/6 |
| 6,021,451 | * | 2/2000 | Bell et al. ............................. 710/128 |
| 6,021,473 | * | 2/2000 | Davis et al. .......................... 711/141 |

* cited by examiner

Primary Examiner—Matthew M. Kim
Assistant Examiner—B. Peugh
(74) Attorney, Agent, or Firm—Steve Bongini; Theodore E. Galanthay; Lisa K. Jorgenson

(57) ABSTRACT

In a computer system, a processing unit generates a read request and sends it to a cache. If data for the read request is not in the cache, the cache forwards the request to a bus interface unit. If the forwarded request does not fall within the address range of any bus read transaction stored in the bus interface unit, the bus interface unit stores a new bus read transaction corresponding to the forwarded request and sends an identifier for the new transaction to the processing unit. In one preferred embodiment, if the forwarded request falls within the address range of one of the bus read transactions stored in the bus interface unit, the bus interface unit discards the forwarded request and sends an identifier for the one transaction to the processing unit. Additionally, a method of processing read requests is provided. A read request is stored in a buffer and sent to a cache. The request is selectively forwarded to a transaction processing unit, and, if the forwarded request does not fall within the address range of any bus read transaction stored in the transaction processing unit, a new bus read transaction is stored in the transaction processing unit and an identifier for the new transaction is sent to the buffer.

19 Claims, 4 Drawing Sheets

COMPUTER SYSTEM HAVING NON-BLOCKING CACHE AND PIPELINED BUS INTERFACE UNIT

CROSS-REFERENCE TO RELATED APPLICATIONS

The present application is related to the inventor's applications "BUS INTERFACE UNIT HAVING MULTIPURPOSE TRANSACTION BUFFER" and "BUS INTERFACE UNIT HAVING DUAL PURPOSE TRANSACTION BUFFER", which were filed on the same day as the present application. These related applications are herein incorporated by reference.

FIELD OF THE INVENTION

The present invention relates to a computer system, and more specifically to a computer system having an out-of-order processing unit, a non-blocking cache, and a pipelined bus interface unit.

BACKGROUND OF THE INVENTION

A typical conventional computer system includes an out-of-order central processing unit ("CPU"), a non-blocking cache subsystem, and a pipelined bus interface unit ("BIU"). During operation, a read or write request from the CPU is first sent to the cache. If the cache contains the target data (i.e., on a cache hit), the cache directly services the request. Conversely, if the cache does not contain the target data (i.e., on a cache miss) or if the request is directed to an uncacheable memory address or an input/output ("I/O") address, the cache passes the request on to the BIU. When the BIU receives a read or write request, the request is submitted to the external memory or I/O systems using a predefined bus protocol, and any results are returned back to the cache and CPU (via the cache). Additionally, the cache services snoop requests from external agents such as other processors in order to perform cache-coherency operations.

One bus protocol used in modern computer systems is the Pentium® II bus protocol as defined in Volume 1 of the Pentium Pro Family Developer's Manual, which is published by Intel Corporation (Santa Clara, Calif.) and is herein incorporated by reference. In accordance with this protocol, the BIU communicates with the memory and I/O systems using several different read and write request transaction formats including: bus read line ("BRL"), bus read and invalidate line ("BRIL"), bus invalidate line ("BIL"), bus write line ("BWL"), bus read partial ("BRP"), bus write partial ("BWP"), I/O read ("IOR"), and I/O write ("IOW"). A brief description of each of these transactions will now be given.

A bus read line transaction is requested when a new line is to be loaded into the cache. When a CPU read from a cacheable address misses the cache, the cache issues a BRL transaction to the BIU. In response, the BIU makes a read request to main memory for the number of bytes required to fill a cache line (e.g., 32 bytes). Because the CPU can process read transactions speculatively and out-of-order, BRLs do not have any ordering requirements either with respect to each other or with respect to other types of bus transactions.

A bus read and invalidate line transaction is initiated when a CPU write transaction to a cacheable address misses the cache. Like a BRL, a BRIL causes the BIU to read a line from external memory. Additionally, the addressed line is invalidated in all other caches (for external agents in the system) in which the line resides. Although in conventional systems memory writes must generally be kept in order, a BRIL does not directly influence the ordering of the CPU write transaction from which it was generated. Thus, BRILs do not have any ordering requirements either with respect to each other or with respect to other types of bus transactions.

Similarly, a bus invalidate line transaction is initiated when a CPU write to a cacheable address hits a shared line in the cache. Such a shared line must be changed to the exclusive state before it can be modified by the CPU. The BIL transaction is used to invalidate the addressed line in all other caches in which the line resides, without reading any data from the external memory. BILs also do not have any ordering requirements either with respect to each other or with respect to other types of bus transactions.

A bus write line transaction is generated when the cache writes a displaced cache line back to memory so that a new line can be loaded into the cache. A BWL is also generated when multiple CPU write transactions to uncacheable memory addresses are accumulated (i.e., write-combined) in the BIU. In a BWL, an entire line (e.g., 32 bytes) is written to the external memory. Like BRLs, BWLs do not have any ordering requirements either with respect to each other or with respect to other types of bus transactions.

The bus read partial and I/O read transactions are generated when the CPU issues a read transaction that is directed to an uncacheable memory address or an I/O address, respectively. When a BRP or an IOR is submitted to the bus by the BIU, one to eight bytes of data are read from the designated address. Similarly, the bus write partial I/O write transactions are generated when the CPU issues a write transaction to an uncacheable memory address or an I/O address. The BWP and IOW transactions cause one to eight bytes of data to be written to the designated address. While the BIU must issue BRPs, BWPs, IORs, and IOWs to the bus in the order in which they are received from the CPU, these types of transactions do not have any ordering requirements with respect to BRLs, BRILs, BILs, and BWLs.

Because speculative out-of-order instruction execution is supported, the CPU can send a memory read request to the cache before receiving the results of previously-sent read requests. In other words, out-of-order execution of memory-referencing instructions can cause many CPU read requests to be simultaneously outstanding (i.e., waiting for data). Similarly, when the requested data is not in the cache, the non-blocking cache can send the read request on to the BIU without waiting for the completion of previously-sent read requests. In order to manage this out-of-order data flow, the CPU includes a memory shelf unit that sends read requests to the cache and stores information relating to outstanding read requests.

The conventional memory shelf has an entry for each incomplete CPU read request to identify the instruction awaiting the requested data When the cache (on a cache hit) or BIU (on a cache miss) returns data to the CPU, the identity of the instruction that requested the data must also be provided to the memory shelf so that the instruction can be rescheduled by the CPU. For this purpose, each read request issued by the memory shelf is given a numeric identifier, which is known as a read identifier ("RID"). The memory shelf sends an RID to the cache along with each new CPU read request, and the cache and BIU keep track of the RIDs of all read requests being processed. When a read request is completed, its RID is returned to the memory shelf along with the requested data so that the memory shelf can identify which instruction requested the data.

Additionally, regardless of the actual amount of data requested by a cacheable read transaction (e.g., from 1 to 8 bytes), the typical BIU always requests a line of data (i.e., the smallest amount of data that can be loaded into the cache) from external memory. Thus, whenever multiple read requests from the memory shelf request data from the same cache line, the BIU can combine the requests into a single bus transaction. The BIU compares the addresses of newly-received read requests with the address ranges of all incomplete read requests, which are stored in a transaction buffer known as the bus request queue ("BRQ"). If the address of a new read request falls within the address range of a data line already being retrieved from memory, the new read request is discarded. In this manner, multiple read requests of arbitrary size are "collapsed" into a single BRL in order to avoid the issuance of redundant bus transactions.

While the collapsing of CPU read requests increases the efficiency of the system bus, this feature presents a problem in systems having a non-blocking cache. In particular, after the BIU obtains a line of data that includes data for multiple CPU read requests, the memory shelf must be informed that the data for all of those read requests is available so that the corresponding instructions can be rescheduled. However, in the conventional collapsing process described above, the BIU simply discards all new read requests that fall within the address range of a data line already being retrieved. Thus, the BIU only stores the RID of the CPU read request that initiated the BRL, and only that RID can be provide to the memory shelf. In other words, after retrieving a line of data from memory, the BIU cannot return the RIDs for all read requests that were awaiting the data from that line.

Several tactics for overcoming this problem have been proposed. According to one approach, the BIU is prevented from simultaneously processing more than one read request. Once a CPU read request misses the cache, all subsequent read requests that miss the cache are suspended until the first request is completed. The memory shelf must later reissue all read requests that were suspended. While this approach properly returns all RIDs to the memory shelf, it also completely eliminates the concurrent processing of CPU read requests by the BIU. Another approach is to provide extra data fields in each BRQ entry so that multiple RIDs can be stored with each bus transaction. This allows multiple RIDs to be identified with a single bus transaction but sets a physical limit on the number of CPU read requests that can be collapsed into each transaction.

Yet another approach is to have the memory shelf keep track of all CPU read requests that are waiting for the same line to be retrieved from memory. After the memory shelf sends a CPU read request that accesses a particular cache line, subsequent requests for data from the same line are merely linked with the sent request in the memory shelf (e.g., using pointers). Then, when the RID for the sent request is returned, the memory shelf causes that request and all internally linked requests to be reissued. Thus, the memory shelf unit of the CPU becomes responsible for the collapsing of CPU read requests into a single bus transaction.

SUMMARY OF THE INVENTION

In view of these drawbacks, it is an object of the present invention to remove the above-mentioned drawbacks and to provide a computer system that both concurrently processes and selectively collapses read requests so as to increase system performance. The computer system includes a processing unit (CPU), a cache, and a bus interface unit (BIU). The CPU includes a memory shelf unit that stores each active CPU read request along with a read identifier (RID) and a bus wait identifier (BWID), and the BIU includes a buffer that stores active bus transactions. The memory shelf sends cacheable CPU read requests and their associated RIDs to the cache. When a read request misses the cache and cannot be collapsed into another transaction, the BIU issues a read line request to the system bus and allocates a BWID for the bus transaction. Additionally, the BIU sends the BWID and the RID to the memory shelf so that the memory shelf can associate the original CPU read request with the issued bus tansaction. Then, whenever a subsequent CPU read request falls within the address range of the bus transaction, the BIU discards the read request and sends the BWID for the bus transaction to the memory shelf along with the RID of the discarded request. Thus, the memory shelf stores the same BWID for all CPU read requests that are collapsed into a single bus transaction. When the data is retrieved from memory, the BWID is sent to the memory shelf along with a completion signal so that all instructions associated with the BWID can be rescheduled. This association of an RID with each CPU read request and a BWID with each bus transaction allows for the collapsing of read requests without limiting the concurrent processing of bus transactions. Furthermore, no limit is placed on the number of CPU read requests that can be collapsed into a single bus transaction, and the memory shelf does not have to have any knowledge of external line sizes because the BIU handles the collapsing of read requests.

A first embodiment of the present invention provides a computer system that includes a processing unit, a cache, and a bus interface unit. The processing unit generates a read request and stores the read request in a buffer. The cache receives the read request and, if data for the read request is not contained in the cache, forwards the read request to the bus interface unit. Further, if the read request is forwarded and does not fall within the address range of any bus read transaction stored in the bus interface unit, the bus interface unit stores a new bus read transaction corresponding to the forwarded read request and sends an identifier for the new bus read transaction to the processing unit. In one preferred embodiment, if the read request is forwarded and falls within the address range of one of the bus read transactions stored in the bus interface unit, the bus interface unit discards the forwarded read request and sends an identifier for the one bus read transaction to the processing unit.

According to a second embodiment of the present invention, a method of processing read requests in a computer system is provided. According to the method, a read request is stored in a buffer and sent to a cache. The read request is selectively forwarded to a transaction processing unit, and, if the forwarded read request does not fall within the address range of any bus read transaction stored in the transaction processing unit, a first storing process is performed. In the first storing process, a new bus read transaction corresponding to the forwarded read request is stored in the transaction processing unit, and an identifier for the new bus read transaction is sent to the buffer. In one preferred method, if the forwarded read request falls within the address range of one of the bus read transactions stored in the transaction processing unit, a second storing process is performed. In the second storing process, an identifier for the one bus read transaction is sent to the transaction processing unit, and the forwarded read request is discarded.

Other objects, features, and advantages of the present invention will become apparent from the following detailed description. It should be understood, however, that the detailed description and specific examples, while indicating preferred embodiments of the invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 4:
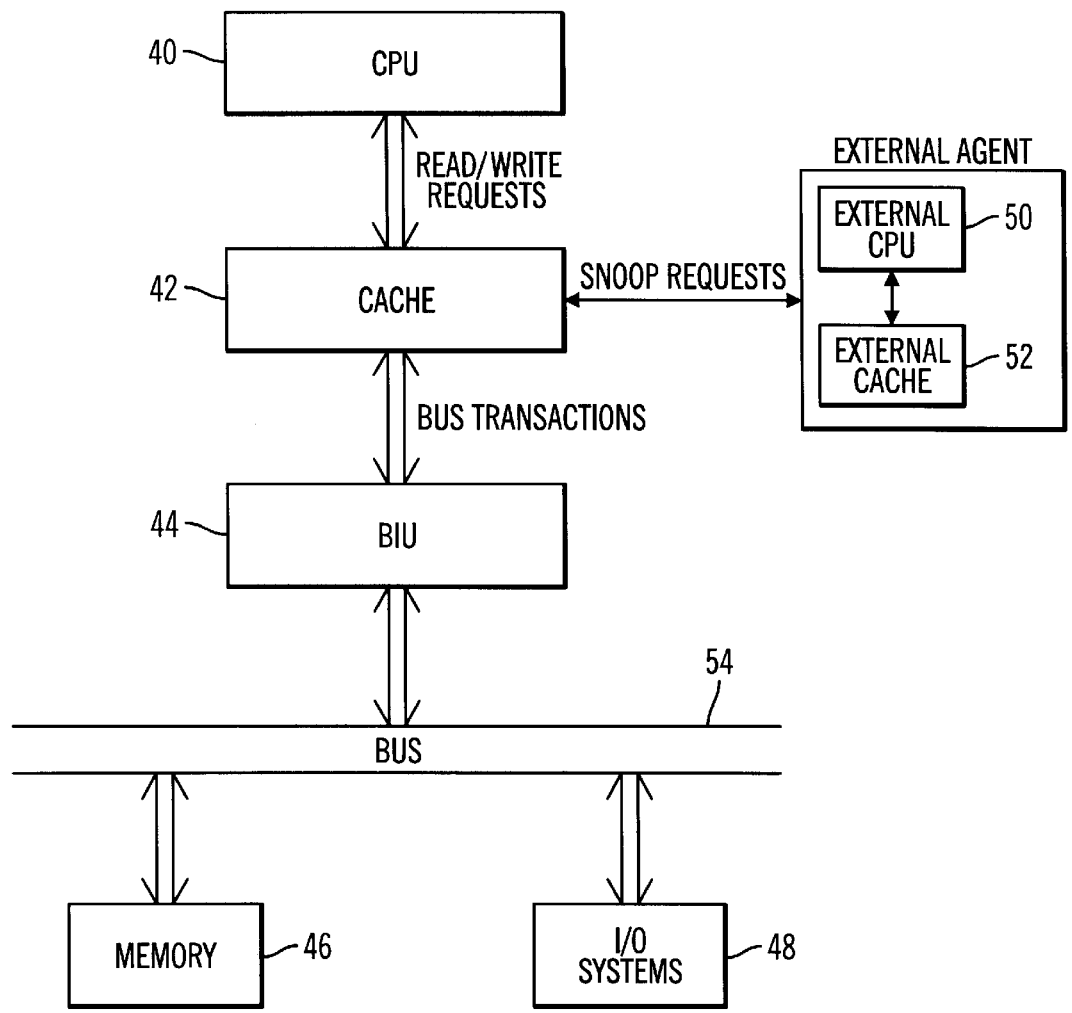
FIG. 4 is a block diagram of a computer system that includes a cache and a bus interface unit.

In a computer system, a non-blocking cache subsystem 42 is connected between an out-of-order processing unit ("CPU") 40 and a pipelined bus interface unit ("BIU") 44, as shown in FIG. 4. The BIU is also connected to the system bus 54, along with external memory 46 and various I/O systems 48. In some systems, external agents (such as external CPU 50 and its cache 52) are also coupled to the cache 42. In preferred embodiments, the system bus operates in accordance with the Pentium® II bus protocol described above.

Figure 1:
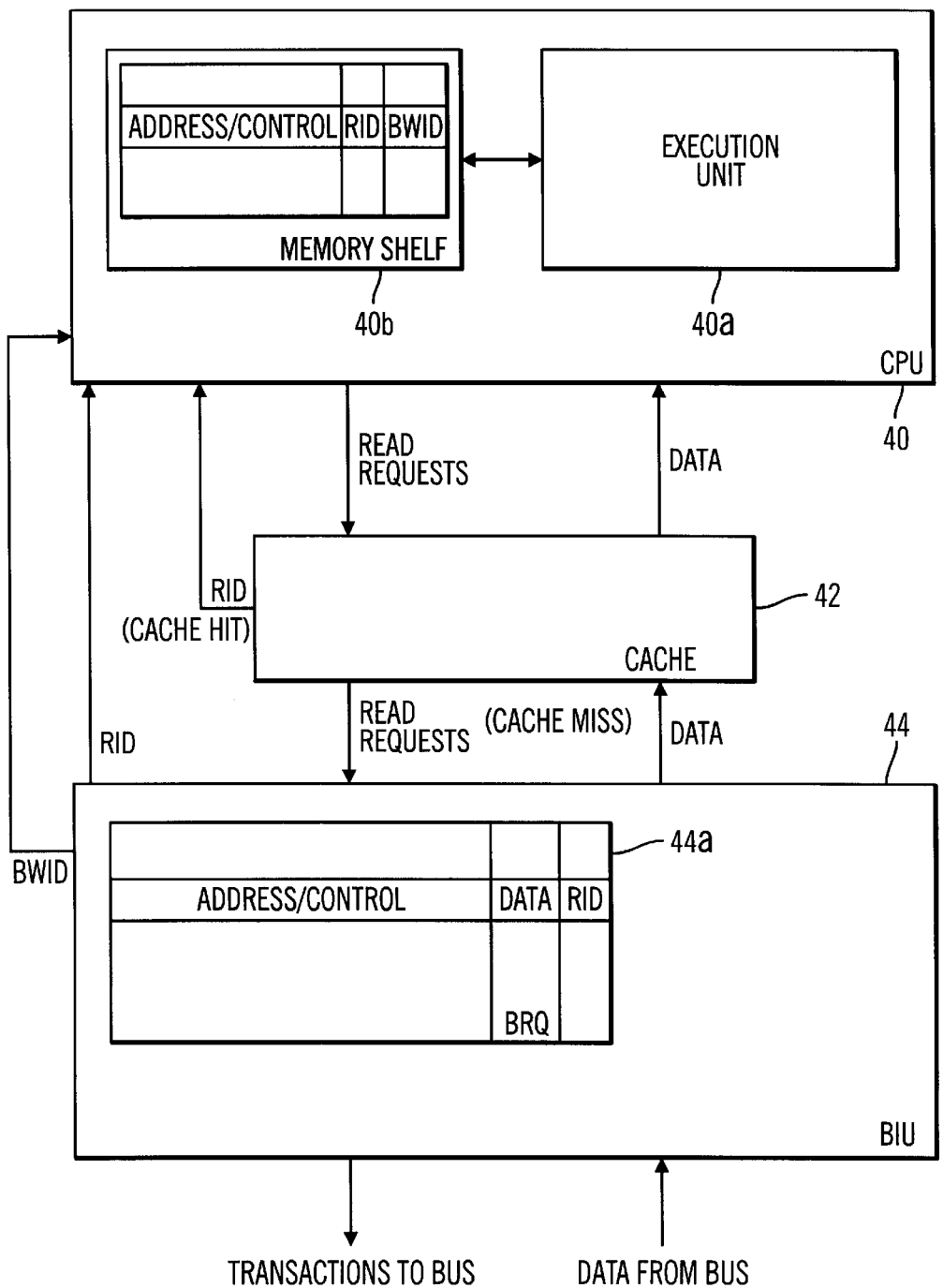
FIG. 1 is a block diagram of essential portions of a computer system according to a preferred embodiment of the present invention.

FIG. 1 shows a block diagram of the CPU, cache, and BIU of a computer system according to a preferred embodiment of the present invention. As shown, the CPU 40 includes a memory shelf unit 40b having entries for storing read requests from the CPU execution unit 40a, and the BIU 44 includes a tansaction buffer ("BRQ") 44a having entries for storing bus requests from the cache 42. Each entry in the memory shelf includes fields for storing address and control information, a read identifier ("RID"), and a bus wait identifier (BWID"). Similarly, each entry in the BRQ includes fields for address and control information, data, and an RID. During operation, the memory shelf 40b receives read requests from execution unit 40a of the CPU, sends read requests to the cache 42, and receives data and RIDs from the cache. The BIU 44 receives transaction requests from the cache 42, consolidates and orders the received requests, and then issues the transactions on the bus 54. Additionally, the BIU 44 receives data from the bus, sends data to the cache 42, and sends RIDs and BWIDs to the memory shelf 40b.

Figure 2:
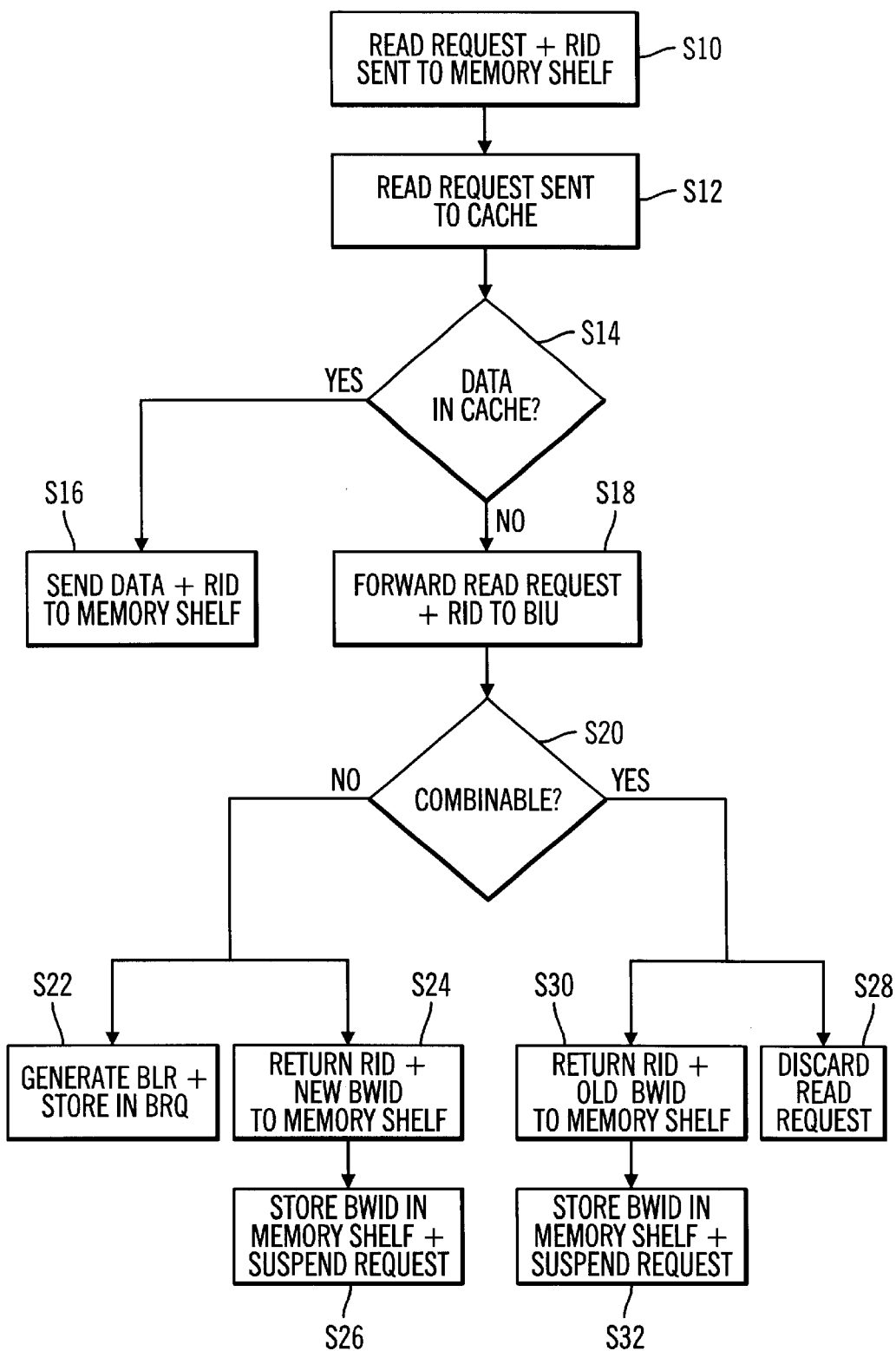
FIG. 2 is a flow chart for the processing of CPU read requests in the computer system of FIG. 1.
Figure 3:
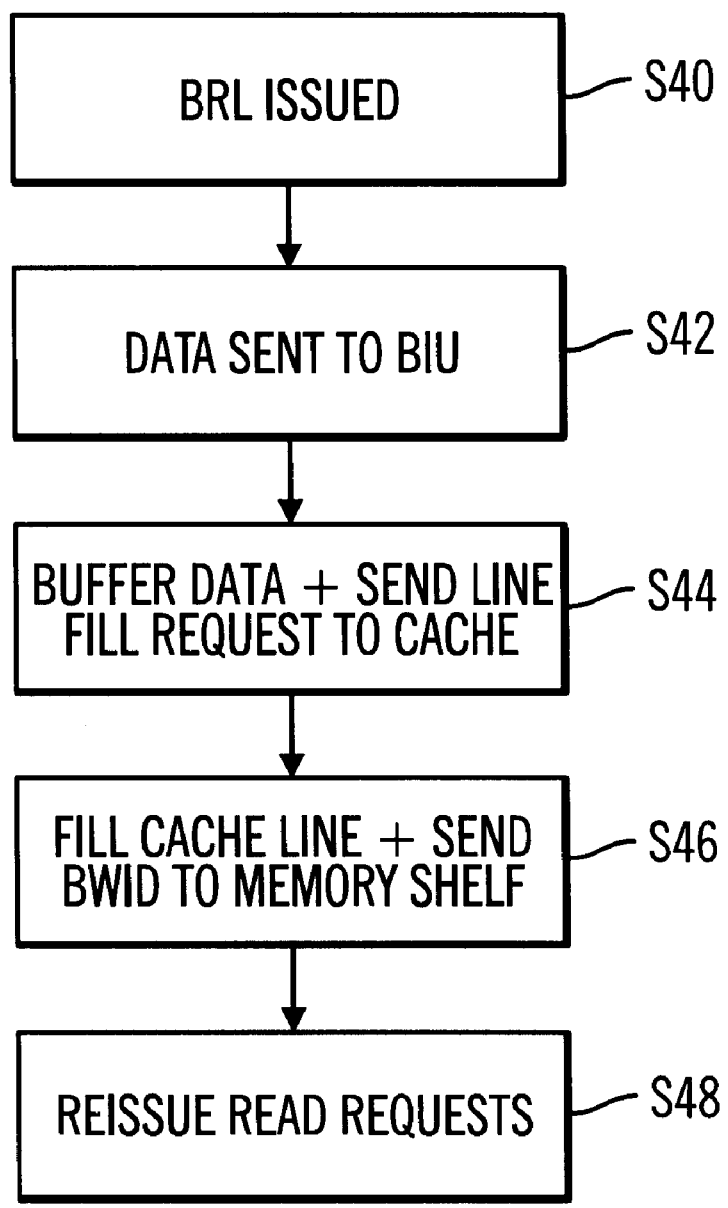
FIG. 3 is a flow chart of the process for sending retrieved data to the CPU in the computer system of FIG. 1.

The operation of the computer system of FIG. 1 with respect to CPU read requests will now be explained with reference to the flowcharts of FIGS. 2 and 3. During the execution of an instruction that references memory, the CPU execution unit 40a generates a read request that is stored in the memory shelf 40b along with a unique RID (S10). The memory shelf sends the CPU read request to the cache (S12). If the data sought by the read request is in the cache (S14), the cache 42 sends the data to the memory shelf 40b along with the RID for the request (S16). (The RID is required because the non-blocking cache allows the memory shelf to send a read request to the cache without waiting for previously-sent requests to be completed, as explained above.) The memory shelf then sends the data on to the execution unit 40a for use by the CPU instruction.

Conversely, if the data sought by the read request is not in cache (S14), the cache 42 forwards the CPU read request to the BIU 44 (S18). If the data requested by the CPU does not fall within the address range of a data line already being retrieved from memory (S20), the BIU converts the CPU read request into a BRL. That is, the BIU creates a bus transaction (BRL) that will retrieve the line of data (e.g., 32 bytes) that includes the data (e.g., 1 to 8 bytes) requested by the CPU, and stores the new bus transaction in the BRQ 44a (S22). Additionally, the BIU 44 sends to the memory shelf 40b both the RID for the CPU read request and a BWID that uniquely identifies the bus transaction that was created from the request (S24). The memory shelf then stores the BWID in its entry for the CPU read request and marks the request as suspended (using the RID sent by the BIU to identify the proper request) (S26). In preferred embodiments, the BWID is simply a pointer to the BRQ entry that stores the BRL.

On the other hand, if the data requested by the CPU read request falls within the address range of a data line already being retrieved by the BIU (S20), the request is collapsed into the existing bus transaction. More specifically, the BIU 44 compares the address of the received CPU read request with the address ranges of all BRLs already stored in the BRQ 44a. When there is a match, the BIU 44 discards the CPU read request (S28), and sends the RID for the request and the BWID for the matching BRL to the memory shelf 40b (S30). The memory shelf stores the BWID in its entry for the CPU read request and marks the request as suspended (S32). In this manner, multiple CPU read requests can be collapsed into a single bus transaction with the corresponding entries in the memory shelf being linked with a common identifier and suspended.

When the line of data requested by an issued BRL is retrieved (S40 and S42), the BIU stores the data in the BRQ 44a and sends a line fill request to the cache (S44). When the cache signals that it is ready, the BIU 44 sends the line of data to the cache 42 and sends the BWID for the completed BRL to the memory shelf 40b (along with a completion signal) (S46). In response, the memory shelf reissues all CPU read requests whose entries contain that BWID (S48). Because the requested data is now in the cache (S14), the cache 42 can send the data for each reissued read request to the memory shelf 40b along with the RID for the request (S16). The memory shelf sends the data on to the execution unit 40a and reschedules the corresponding CPU instructions.

As described above, the present invention provides a computer system that increases performance through the efficient handling of CPU read requests. If a CPU read request misses the cache and cannot be collapsed into another transaction, the BIU issues a read line transaction and sends to the CPU a bus transaction identifier (BWID) along with the read request identifier (RID) for the original request. Whenever a subsequent CPU read request falls within the address range of the read line transaction, the BIU sends the transactions BWID and the new request's RID to the CPU. After the line of data is retrieved by the BIU, the BWID is returned to the CPU along with a completion signal. Because the CPU has associated that BWID with all CPU read requests seeking data from the retrieved line, all such requests can be identified for reissuing. This use of both RIDs and BWIDs allows for the efficient collapsing of read requests in a system that supports simultaneous bus transactions. Further, the collapsing of requests is handled by the BIU and the number of read requests that can be combined by the BIU is not limited.

The embodiments of the present invention described above relate to a computer system using Pentium®-type processors and a system bus that operates in accordance with the Pentium® II bus protocol. However, the read request handling described above could also be implemented in a system that utilizes a different type of processor and/or a different bus protocol. Similarly, while the above embodiments are described in relation to a multiple processor computer system, single or multiple processor computer system having varying features and abilities could implement the read request handling process of the present invention. Additionally, other design choices, such as the computer system's architecture, the number and format of the entries in the memory shelf and the transaction buffer, the size of the cache, and the number and types of devices connected to the system bus could easily be adapted by one of ordinary skill in the art. Furthermore, embodiments of the present invention may not include all of the features described above.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A computer system having a bus, said computer system comprising:
   a processing unit that generates at least one read request and stores the read request in a first buffer, the first buffer having entries for storing generated read requests;
   a bus interface unit that includes a second buffer having entries for storing at least bus read transactions; and
   a cache, which is coupled between the processing unit and the bus interface unit, that receives the read request, the cache forwarding the read request and an identifier for the read request to the bus interface unit if data for the read request is not contained in the cache,
   wherein if the forwarded read request falls within the address range of one of the bus read transactions stored in the second buffer of the bus interface unit, the bus interface unit sends the identifier for the read request and an identifier for the one bus read transaction to the processing unit.

2. The computer system as defined in claim 1, wherein if the forwarded read request does not fall within the address range of one of the bus read transactions stored in the second buffer, the bus interface unit stores a new bus read transaction, which corresponds to the forwarded read request, in the second buffer and sends an identifier for the new bus read transaction and the identifier for the read request to the processing unit.

3. The computer system as defined in claim 1, wherein when the new bus read transaction is completed, the bus interface unit again sends the identifier for the new bus read transaction to the processing unit along with a completion signal.

4. The computer system as defined in claim 2, wherein when the new bus read transaction is completed, the bus interface unit again sends the identifier for the read request and the identifier for the new bus read transaction to the processing unit along with a completion signal.

5. The computer system as defined in claim 1, wherein if the forwarded read request falls within the address range of one of the bus read transactions stored in the second buffer, the bus interface unit discards the forwarded read request.

6. The computer system as defined in claim 1,
   wherein the cache receives the read request along with the identifier for the read request.

7. The computer system as defined in claim 1, wherein if data for the read request is contained in the cache, the cache sends the data to the processing unit.

8. The computer system as defined in claim 1,
   further comprising external memory coupled to the bus interface unit through the bus,
   wherein the bus interface unit selectively issues bus read transactions stored in the second buffer to the bus in order to access the external memory.

9. The computer system as defined in claim 8, further comprising an external agent including at least an external processing unit, the external agent being coupled to the cache.

10. A method of processing read requests in a computer system having a bus, said method comprising the steps of:
    storing a read request in a first buffer;
    sending the read request to a cache;
    selectively forwarding the read request and an identifier for the read request to a transaction processing unit, which includes a second buffer having entries for storing at least bus read transactions; and
    if the forwarded read request falls within the address range of one of the bus read transactions stored in the second buffer of the transaction processing unit, performing a first read request storing process that includes the steps of:
    sending the identifier for the read request and an identifier for the one bus read transaction to the first buffer; and
    discarding the forwarded read request.

11. The method as defined in claim 10, further comprising the steps of:
    if the forwarded read request does not fall within the address range of any bus read transaction stored in the second buffer, performing a second read request storing process that includes the steps of:
    storing a new bus read transaction, which corresponds to the forwarded read request, in the second buffer; and
    sending an identifier for the new bus read transaction and the identifier for the read request to the first buffer.

12. The method as defined in claim 10, further comprising the steps of:
    completing the new bus read transaction; and
    sending the identifier for the new bus read transaction to the first buffer along with a completion signal.

13. The method as defined in claim 11, further comprising the steps of:
    completing the new bus read transaction; and
    sending the identifier for the read request and the identifier for the new bus read transaction to the first buffer along with a completion signal.

14. The method as defined in claim 10, further comprising the step of:
    sending the identifier for the read request to the cache.

15. The method as defined in claim 10, wherein the read request is forwarded to the transaction processing unit if data for the read request is not contained in the cache.

16. The method as defined in claim 15, wherein if data for the read request is contained in the cache, the cache sends that data to the first buffer.

17. The method as defined in claim 10, further comprising the step of selectively issuing bus read transactions stored in the second buffer to the bus in order to access external memory.

18. A machine-readable medium encoded with a program for processing read requests in a computer system having a bus, said program containing instructions for performing the steps of:

storing a read request in a first buffer;

sending the read request to a cache;

selectively forwarding the read request and an identifier for the read request to a transaction processing unit, which includes a second buffer having entries for storing at least bus read transactions; and if the forwarded read request falls within the address range of one of the bus read transactions stored in the second buffer of the transaction processing unit, performing a first read request storing process that includes the steps of:

sending the identifier for the read request and an identifier for the one bus read transaction to the first buffer; and discarding the forwarded read request.

19. The machine-readable medium as defined in claim 18, wherein said program further contains instructions for performing the step of:

if the forwarded read request does not fall within the address range of any bus read transaction stored in the second buffer, performing a second read request storing process that includes the steps of:

storing a new bus read transaction, which corresponds to the forwarded read request, in the second buffer; and sending an identifier for the new bus read transaction and the identifier for the read request to the first buffer.

* * * * *